(12) United States Patent
Wisnovsky (10) Patent No.: US 9,575,871 B2
(45) Date of Patent: Feb. 21, 2017

(54) SYSTEM AND METHOD FOR DYNAMICALLY DEBUGGING DATA IN A MULTI-TENANT DATABASE ENVIRONMENT

(71) Applicant: salesforce.com, inc., San Francisco, CA (US)

(72) Inventor: Peter Wisnovsky, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 390 days.

(21) Appl. No.: 14/017,676

(22) Filed: Sep. 4, 2013

(65) Prior Publication Data

US 2014/0068568 A1 Mar. 6, 2014

Related U.S. Application Data

(60) Provisional application No. 61/696,585, filed on Sep. 4, 2012.

(51) Int. Cl.
*G06F 11/36* (2006.01)

(52) U.S. Cl.
CPC ......... *G06F 11/3636* (2013.01); *G06F 11/362* (2013.01); *G06F 11/3664* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |

(Continued)

OTHER PUBLICATIONS

Reiss, "Visualizing the Java heap to detect memory problems," 2009, 5th IEEE International Workshop on Visualizing Software for Understanding and Analysis, pp. 73-80.*

(Continued)

*Primary Examiner* — Thuy Dao
*Assistant Examiner* — Stephen Berman
(74) *Attorney, Agent, or Firm* — Lorenz & Kopf LLP (57) ABSTRACT

Methods and systems are provided for debugging application code in an on demand environment. The method includes executing the code on a server in the on demand environment; identifying a first location within the code having a suspected error; defining a first check point within the code corresponding to the first location; subsequently re-executing the code, including the first check point, on the server; creating a memory dump corresponding the first check point during re-execution of the code; and debugging the code based on the heap dump without suspending subsequent re-execution of the code.

19 Claims, 3 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,412,455 B2 | 8/2008 | Dillon |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 9,459,991 B2 * | 10/2016 | Vennam ............ G06F 11/3664 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0088854 A1 * | 5/2003 | Wygodny ............ G06F 11/3636 717/130 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0030960 A1 * | 2/2004 | Ito ..................... G06F 11/3664 714/38.11 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0183068 A1 * | 8/2005 | Cwalina ............ G06F 11/3466 717/128 |
| 2005/0251794 A1 * | 11/2005 | Taylor ................ G06F 11/3664 717/148 |
| 2006/0041866 A1 * | 2/2006 | Sivaram ............. G06F 11/362 717/124 |
| 2007/0011497 A1 * | 1/2007 | Walker ............... G06F 11/3636 714/45 |
| 2007/0011517 A1 * | 1/2007 | Boyce ................ G06F 11/2236 714/724 |
| 2007/0011656 A1 * | 1/2007 | Kumamoto ......... G06F 11/3664 717/124 |
| 2008/0141224 A1 * | 6/2008 | Kawasaki ............ G06F 11/362 717/127 |
| 2008/0249972 A1 | 10/2008 | Dillon |
| 2009/0063414 A1 | 3/2009 | White et al. |
| 2009/0089626 A1 * | 4/2009 | Gotch ................. G06F 11/3476 714/45 |
| 2009/0204926 A1 * | 8/2009 | Cochrane ................. G06F 8/33 715/781 |
| 2010/0251219 A1 * | 9/2010 | Peacock ............ G06F 11/3636 717/128 |
| 2011/0029822 A1 * | 2/2011 | Moser ................ G06F 11/3636 714/45 |
| 2011/0225458 A1 * | 9/2011 | Zuo ...................... G06F 11/362 714/37 |
| 2012/0017123 A1 * | 1/2012 | Masser .............. G06F 11/3636 714/45 |
| 2013/0007404 A1 * | 1/2013 | Malcolm ............ G06F 11/366 711/171 |
| 2014/0068341 A1 * | 3/2014 | Martineau ............. G06F 11/34 714/38.11 |

OTHER PUBLICATIONS

Maxwell et al., "Diagnosing memory leaks using graph mining on heap dumps," 2010, Proceedings of the 16th ACM SIGKDD international conference on Knowledge discovery and data mining, pp. 115-124.*

Pacheco, "Postmortem Debugging in Dynamic Environments," 2011, Magazine Queue—Programming Languages, vol. 9, Issue 10, Oct. 2011, pp. 1-12.*

* cited by examiner

SYSTEM AND METHOD FOR DYNAMICALLY DEBUGGING DATA IN A MULTI-TENANT DATABASE ENVIRONMENT

CROSS-REFERENCE TO RELATED APPLICATION

This application claims the benefit of U.S. provisional patent application Ser. No. 61/696,585 filed Sep. 4, 2012, the entire contents of which are incorporated herein by this reference.

TECHNICAL FIELD

Embodiments of the subject matter described herein relate generally to computer systems and applications for debugging data, and more particularly to methods for replicating traditional on-premises debugging techniques in an on demand environment.

BACKGROUND

Software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software s between multiple sets of users.

Conventional tools for debugging software and testing executable code (e.g., the Python™ debugger (PDB) or the Java™ debugger (JDB)) typically include holding down connections to the database and suppressing or locking selected resources, memory threads, and database cursors. These problems may be effectively managed in a single-tenant environment, but may be unacceptable for an on demand server hosting multiple users.

Systems and methods are thus needed which overcome the foregoing shortcomings.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for implementing a three-tiered customer support paradigm involving an archival knowledge base, community or peer support, and interaction with a customer support agent (if necessary) seamlessly integrated into a single display feed.

Figure 1:
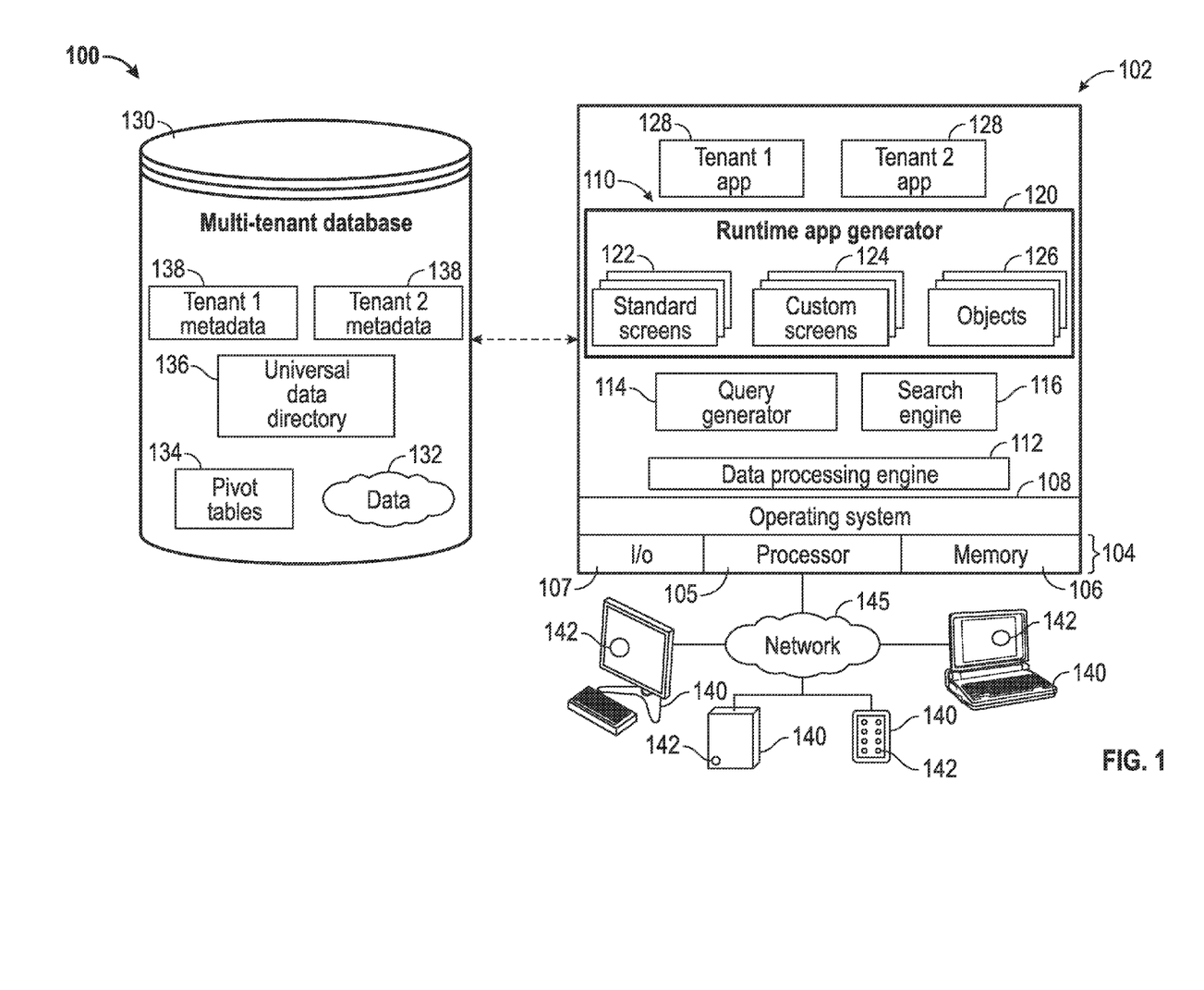
FIG. 1 is a schematic block diagram of a multi-tenant computing environment in accordance with an embodiment.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

In addition to the foregoing "dedicated" syncing clients, the present disclosure also contemplates the automatic sharing of data and files into applications, such as Microsoft Word™, such that saving a document in Word would automatically sync the document to the collaboration cloud. In an embodiment, each client device, application, or web client is suitably configured to run a client application 142, such as the Chatterbox file synchronization module or other application for performing similar functions, as described in greater detail below.

An alternative vector into the automatic syncing and sharing may be implemented by an application protocol interface (API), either in lieu of or in addition to the client application 142. In this way, a developer may create custom applications/interfaces to drive the sharing of data and/or files (and receive updates) with the same collaboration benefits provided by the client application 142.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In various embodiments, virtual application 128 may include tools such as a resource tracker and an off-line debugger which allows debugging of tenant applications without halting or suspending the multi-tenant server. The resource tracker monitors the application at run time and generates a transcript (or log file) identifying points in the source code where resource limits may be exceeded or other suspected bugs may occur. The offline debugger tool simulates or replicates traditional debugging tools, but is designed for use in an on-demand environment. In particular, the offline debugger (or debugger simulator) may include tools and features such as, for example, step-by-step program animation, syntax error handling, and logic error handling functions.

When debugging in a stand-alone environment, the developer may simply halt execution and proceed stepwise through the program flow using a debugger. Since it is not practical to suspend code execution in a shared server environment, the present system simulates or mimics the performance advantages of conventional debuggers, without having to suspend code execution.

In accordance with various embodiments, application 128 may be configured to run various executable applications using, for example, Salesforce's™ proprietary Apex™ language. As the server executes the code, a real time transcript of step-wise machine actions (including associated metadata) may be written to a log. During subsequent debugging, the transcript is retrieved loaded into a simulated debugger which may be used as a surrogate for a conventional debugger. In this way, the debugging process may proceed stepwise through the transcript using logged execution data to recapitulate the process under inspection, while normal code execution proceeds in parallel. Consequently, the live process continues uninterrupted, while debugging is performed on the shadow version of the live process stored in the transcript.

It is impractical to record every memory allocation at every step during execution, as this would yield a massive log (e.g., 1 Gigabyte of data for each second of code execution) and unnecessarily consume excessive memory and processing resources. Rather, in accordance with an embodiment, a check point or heap dump location (also referred to as an Apex execution overlay action) may be defined, and an exhaustive dump of everything in memory is performed at each check point. The check point locations may be determined automatically based on predetermined limits, or may be more subjectively defined by the developer based on traditional metrics associated with program bugs. For example, when reviewing error logs in the ordinary course, a developer or administrator may identify locations in the executable code where errors or bugs appear to exist. The developer then defines one or more check points at or near the suspected problematic code. When the application is subsequently run (re-executed), the system takes a complete dump of the heap; that is, a comprehensive transcript is logged of all step-wise machine actions in the vicinity of the check point. The logged transcript may then be debugged off line in the ordinary course, without disrupting live processing.

In a multi-tenant environment, impose resource and memory allocation limits may be imposed using a software based limit tracker (resource tracker) tool which evaluates metadata during execution, and creates a transcript of the output of the limit tracker. If the limit tracker detects that a limit may be exceeded at a particular point in the code during execution, it sends a message to that effect to the transcript. This message is a flag to the developer to indicate a candidate check point for creating a full heap dump the next time the code is executed. For example, if a tenant is allowed 50 database queries during a particular application (or period of time), and run time execution generated 100 database queries, a flag would be set and the administrator can set a check point to look further into why the database query limit was exceeded. Thus, limits may be set and excesses measured and tracked, and messages sent to the transcript as the requests are processed. Various forms of visualization (e.g., messages, graphical summaries) may also be provided illustrating how deeply an application consumes its resource limits (also referred to as governor limits).

In reviewing the log, a developer can insert check points into source code based on source code locations referenced in the log without having to actually look at the source code. Alternatively, the off-line diagnostic tool allows the developer to open a window into the source code and enter the check point directly into source code.

The debugger simulator tool may be used by the multi-tenant admin to fix code on the multi-tenant administrator side of the multi-tenant wall. In addition, this same functionality and tools can be made available for each tenant through APIs, but of course any particular tenant can only access that tenant's own data.

Figure 2:
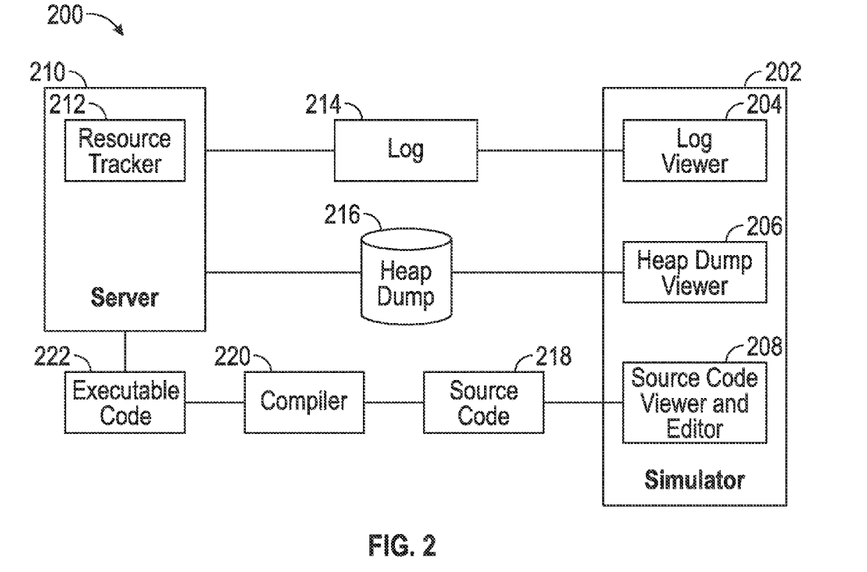
FIG. 2 is a block diagram of an exemplary off-line debugging tool for use in a multi-tenant computing environment in accordance with an embodiment.

FIG. 2 is a functional block diagram of an exemplary off-line debugging tool architecture 200 for use in a multi-tenant computing environment in accordance with an embodiment. More particularly, the architecture 200 includes an off-line debugging tool (or simulator) 202 having a log viewer 204, a transcript viewer 206, and a source code window (viewer) 208. Architecture 200 also includes a processor 210 (analogous to processor 105 of the multi-tenant server shown in FIG. 1) having a resource tracker 212, a log file 214, a memory sector (e.g., heap dump) 216, a source code module 218, a compiler 220, and an executable code module 222.

With continued reference to FIG. 2, executable code is retrieved from module 222 and processed by the processor 210. At run time, the resource tracker 212 monitors the execution of the application, generates a step-wise transcript, and stores the transcript in the log file 214. The resource tracker (or limit tracker) 212 identifies locations in the application where resource limitations or other predetermined metrics are observed which may warrant further analysis by an administrator, developer, or the like. For this purpose, the simulator 202 includes log viewer 204. When reviewing the log, a developer may define check points (discussed in greater detail below in connection with FIG. 3) which identify locations (e.g., specific lines) within the code where suspected bugs or errors exist. By defining these check points, a more exhaustive memory dump (heap dump) at the checked locations may be obtained during subsequent running of the application.

Upon inserting check points into the executable code, the code is re-executed on processor 210 in the ordinary course. When each check point is encountered, the processor creates a complete memory dump and stores it in memory sector 216. The heap dump viewer feature 206 of simulator 202 may be used to review the heap dump and troubleshoot or otherwise debug the software. In addition, the source code reviewer and editor feature 208 of simulator may be used for further diagnosis, or to edit the source code directly. After editing, the source code may be re-compiled in compiler 220 and loaded into executable code module 222 for subsequent execution by the processor 210.

Figure 3:
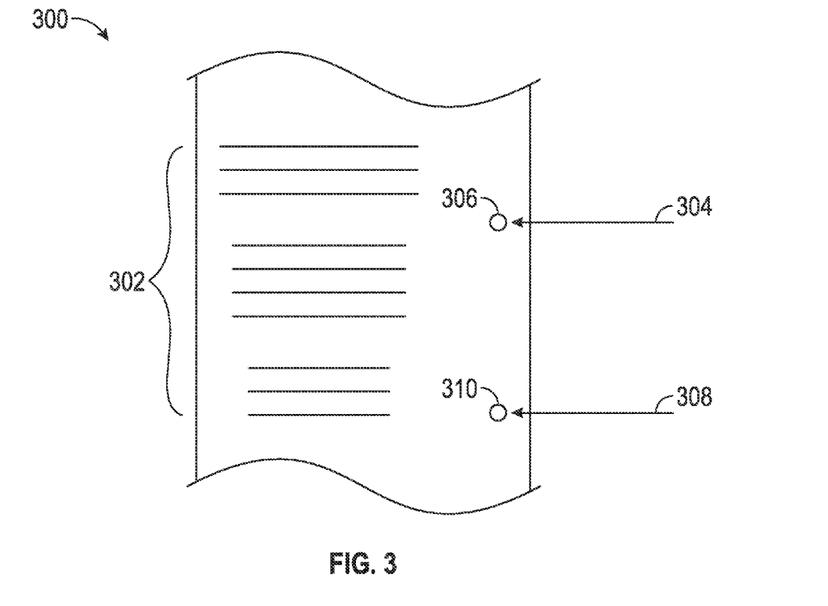
FIG. 3 is a schematic diagram of a source code listing illustrating check point locations in accordance with an embodiment.

FIG. 3 is a schematic diagram of an exemplary source code file 300 illustrating check point locations in accordance with an embodiment. More particularly, the source code file 300 includes individual lines 203 of code. As discussed above, various locations 304, 308—corresponding to modules or specific lines of code—may be identified as potential bugs, for example, using the resource tracker 212. In accordance with an embodiment, a first checkpoint 306 may be registered at location 304, and a second check point 310 may be registered at location 308. Upon subsequent processing of the application, complete memory dumps may be written to memory sector 216 for these check points.

Figure 4:
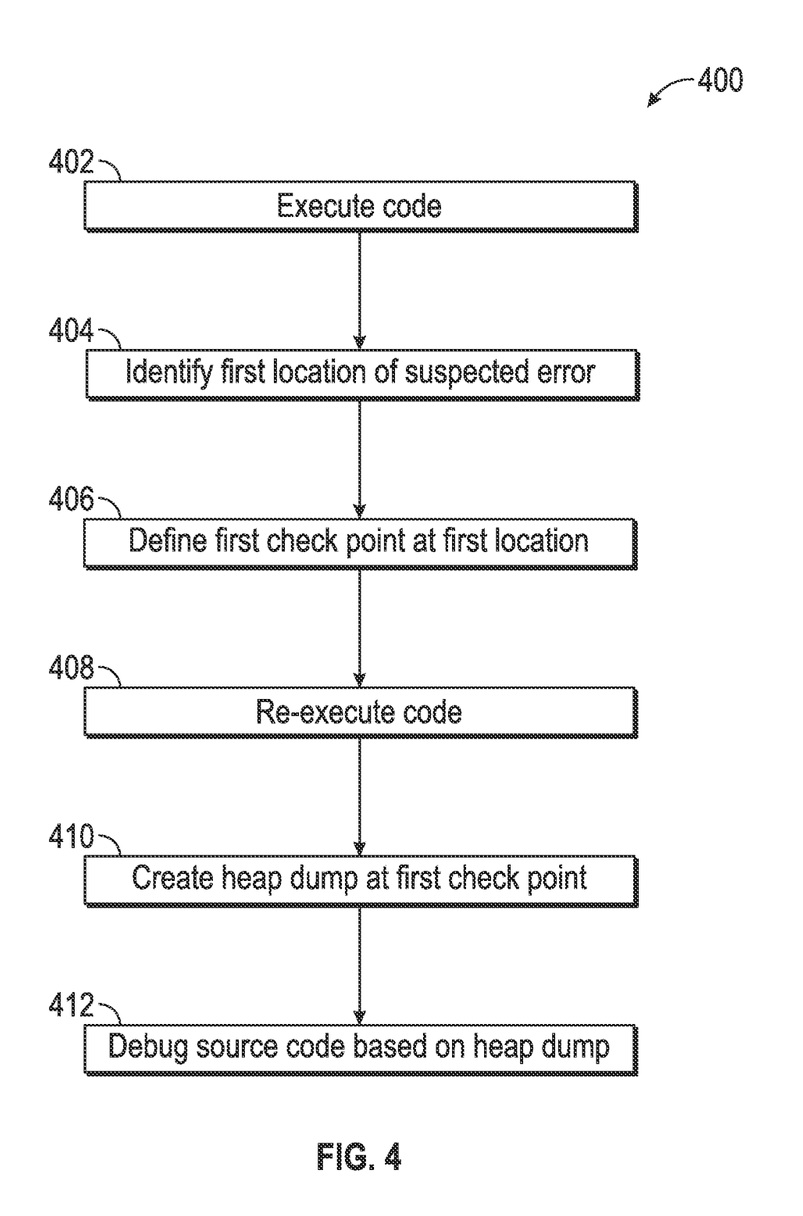
FIG. 4 is a flow diagram of an exemplary method for off-line debugging in accordance with an embodiment.

FIG. 4 is a flow diagram of an exemplary method 400 for off-line debugging in accordance with an embodiment. More particularly, the method 400 includes executing the code (Task 402) and identifying at least one location of a suspected or actual error or bug (Task 404). The method 400 further includes defining (e.g., inserting) a first check point in the executable code corresponding to the first location (Task 406), and re-executing the code (Task 408). As the code is being re-executed, a heap dump is created for each check point (Task 410). The source code may then be debugged and/or edited (Task 412) based on the heap dump, without suspending or otherwise disrupting subsequent live execution of the code.

Although various embodiments are set forth in the context of a multi-tenant or on-demand environment, the systems and methods described herein are not so limited. For example, the may also be implemented in enterprise, single tenant, and/or stand-alone computing environments.

A method is thus provided for debugging application code in an on demand environment, the method comprising: executing the code on a server in the on demand environment; identifying a first location within the code having a suspected error; defining a first check point within the code corresponding to the first location; subsequently re-executing the code, including the first check point, on the server; creating a memory dump corresponding the first check point during re-execution of the code; and debugging the code based on the heap dump without suspending subsequent re-execution of the code.

The method may also include loading the memory dump into a debugging simulator, wherein debugging comprises debugging the code using the simulator.

In an embodiment, the method may involve creating a step-wise transcript of machine actions and corresponding memory addresses, and identifying the first location based on the transcript, and the transcript may be created using a resource tracker.

In another embodiment, the resource tracker may be configured to monitor at least one predetermined resource limit, and the transcript comprises metadata associated with execution of the code.

In another embodiment, the predetermined resource limit comprises one of: a predetermined number of memory queries; and a predetermined memory size.

The method may also involve: identifying a second location within the code having a suspected error; defining a second check point corresponding to the second location; subsequently re-executing the code, including the first and second check points, on the server; and creating respective memory dumps corresponding the first and second check points.

In an embodiment, defining the first check point may involve inserting a mark in the margin of a source code listing corresponding to the code, and debugging may involve debugging using a simulator, the simulator being configured to perform at least one of: step-by-step program animation, syntax error handling, and logic error handling functions.

A processing system is provided for running and debugging an application in a multi-tenant environment, comprising: a multi-tenant server configured to run the application; a first memory device configured to store a transcript of step-wise operation of the application during run time; a tracking tool configured to identify a first location within the application of a suspected error; a diagnostic tool configured to define a first checkpoint within source code associated with the application corresponding to the first location; and a second memory device configured to store a heap dump associated with execution of the application in the vicinity of the first check point.

In an embodiment, the diagnostic tool comprises a simulator configured to browse the transcript without interrupting running of the application on the server, and the diagnostic tool comprises a log viewer, a heap dump viewer, and a source code editor.

In another embodiment, the tracking tool comprises a resource tracker configured to monitor at least one predetermined resource limit, and the transcript comprises metadata associated with execution of the code.

In a further embodiment, the simulator is configured to perform at least one of: step-by-step program animation, syntax error handling, and logic error handling functions.

Computer code embodied in a non-transitory medium is also provided for operation by a processing system for performing the steps of: run time execution of an application having associated source code; identifying a first location of a suspected error within the application; subsequently re-executing the application; creating a memory dump corresponding the first check point during re-execution of the application; and debugging the source code based on the memory dump without suspending subsequent re-execution of the application.

In an embodiment the computer code is configured for operation in a multi-tenant on demand computing environment. in another embodiment, the computer code is configured for operation in a single tenant computing environment.

In another embodiment, identifying comprises creating a step-wise transcript of machine actions and corresponding memory addresses during run time execution, and identifying the first location based on the transcript.

In another embodiment, the computer code is further configured to load the memory dump into a debugging simulator, wherein debugging comprises debugging the code using the simulator.

The computer code may also be configured to: identify a second location within the application having a suspected error; and create respective first and second memory dumps corresponding to the first and second locations.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method of debugging application code in an on demand environment, the method comprising:
    imposing memory allocation limits using a software-based resource tracker tool;
    executing the code by a server in the on demand environment;
    during execution of the code,
        creating a transcript of step-wise machine actions and associated metadata during execution of the code;
        identifying, by the server, a first location within the code having a suspected error, by:
            detecting that one or more of the memory allocation limits have been exceeded during execution of the code; and
            setting a flag at the first location, based on the one or more of the memory allocation limits being exceeded;
        defining, by the server, a first check point within the code corresponding to the flag at the first location;
    subsequently re-executing the code, including the first check point, by the server;
    creating, by the server, a heap dump corresponding the first check point during re-execution of the code; and
    debugging the code based on the heap dump without suspending the subsequent re-execution of the code, by:
        retrieving the transcript, to create a retrieved transcript;
        loading the retrieved transcript into a simulated debugger used as a surrogate for a conventional debugger; and
        performing a step-wise execution of the retrieved transcript using logged execution data;
    wherein debugging the code is performed in parallel to the subsequent re-execution of the code.

2. The method of claim 1, further comprising loading the heap dump into a debugging simulator, and wherein debugging comprises debugging the code using the simulator.

3. The method of claim 1, further comprising creating a step-wise transcript of machine actions and corresponding memory addresses, and identifying the first location based on the transcript.

4. The method of claim 3, wherein the transcript is created using a resource tracker.

5. The method of claim 4, wherein the resource tracker is configured to monitor at least one predetermined resource limit, and the transcript comprises metadata associated with execution of the code.

6. The method of claim 5, wherein the predetermined resource limit comprises one of: a predetermined number of memory queries; and a predetermined memory size.

7. The method of claim 5, further comprising:
    identifying a second location within the code having a suspected error;
    defining a second check point corresponding to the second location;
    subsequently re-executing the code, including the first and second check points, on the server; and
    creating respective memory dumps corresponding the first and second check points.

8. The method of claim 1, wherein defining the first check point comprises inserting a mark in the margin of a source code listing corresponding to the code.

9. The method of claim 1, wherein debugging comprises debugging using a simulator, the simulator is configured to perform at least one of: step-by-step program animation, syntax error handling, and logic error handling functions.

10. A processing system for running and debugging an application in a multi-tenant environment, comprising:
    a multi-tenant server configured to run the application and to create a transcript of step-wise machine actions and associated metadata during execution of the application;
    a first memory device configured to store the transcript of step-wise operation of the application during run time;
    a tracking tool configured to impose memory allocation limits for a second memory device and to identify a first location within the application of a suspected error, by:
        detecting that one or more of the memory allocation limits have been exceeded during execution of the application; and
        setting a flag at the first location, based on the one or more of the memory allocation limits being exceeded;
    a diagnostic tool configured to define a first checkpoint within source code associated with the application corresponding to the flag at the first location, wherein the multi-tenant server is further configured to re-execute the application after the first checkpoint is defined, wherein the diagnostic tool comprises a simulator configured to browse the transcript without interrupting running of the application on the server; and
    the second memory device configured to store a heap dump associated with execution of the application in the vicinity of the first check point, wherein the diagnostic tool is further configured to debug the application based on the heap dump, by:
        retrieving the transcript, to create a retrieved transcript;
        loading the retrieved transcript into a simulated debugger used as a surrogate for a conventional debugger; and
        performing a step-wise execution of the retrieved transcript using logged execution data;

wherein debugging the code is performed in parallel to the subsequent re-execution of the code, and wherein debugging the application comprises browsing the transcript.

11. The processing system of claim 10, wherein the diagnostic tool comprises a log viewer, a heap dump viewer, and a source code editor.

12. The processing system of claim 10, wherein the tracking tool comprises a resource tracker configured to monitor at least one predetermined resource limit, and the transcript comprises metadata associated with execution of the code.

13. The processing system of claim 10, wherein debugging the application further comprises at least one of: step-by-step program animation, syntax error handling, and logic error handling functions.

14. Computer code embodied in a non-transitory medium for operation by a processing system for performing the steps of:
   imposing memory allocation limits using a software-based resource tracker tool;
   run time execution, by a processor of a server, of an application having associated source code;
   during execution of the application,
      creating a transcript of step-wise machine actions and associated metadata during execution of the code;
      identifying, by the processor, a first location of a suspected error within the application, by:
         detecting that one or more of the memory allocation limits have been exceeded during execution of the application; and
         setting a flag at the first location, based on the one or more of the memory allocation limits being exceeded;
   subsequently re-executing the application, by the processor;
   creating a heap dump, by the processor, the heap dump corresponding to the flag at the first location during re-execution of the application; and
   debugging the source code based on the heap dump without suspending the subsequent re-execution of the application, by:
      retrieving the transcript, to create a retrieved transcript;
      loading the retrieved transcript into a simulated debugger used as a surrogate for a conventional debugger; and
      performing a step-wise execution of the retrieved transcript using logged execution data;
   wherein debugging the source code is performed in parallel to the subsequent re-execution of the application.

15. The computer code of claim 14 configured for operation in a multi-tenant on demand computing environment.

16. The computer code of claim 14 configured for operation in a single tenant computing environment.

17. The computer code of claim 14, wherein identifying comprises creating a step-wise transcript of machine actions and corresponding memory addresses during run time execution, and identifying the first location based on the transcript.

18. The computer code of claim 14, further configured to load the heap dump into a debugging simulator, and wherein debugging comprises debugging the code using the simulator.

19. The computer code of claim 14, further configured to:
   identify a second location within the application having a suspected error; and
   create respective first and second memory dumps corresponding to the first and second locations.

* * * * *